US006608827B1

(12) United States Patent
Austin (10) Patent No.: US 6,608,827 B1
(45) Date of Patent: Aug. 19, 2003

(54) METHOD FOR INCREASING THE COMMUNICATION CAPACITY OF A CELLULAR TELEPHONE SYSTEM

(75) Inventor: Mark David Austin, Atlanta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/241,278

(22) Filed: Feb. 1, 1999

(51) Int. Cl.[7] ............................................... H04B 7/212
(52) U.S. Cl. ...................... 370/348; 370/341; 370/443; 370/465; 455/452; 455/453
(58) Field of Search ................................ 370/477, 347, 370/345, 337, 336, 329, 468, 465, 230, 443, 348, 341, 322; 455/67.1, 452, 453, 522, 436, 422, 425

(56) References Cited

U.S. PATENT DOCUMENTS

| | | | | |
|---|---|---|---|---|
| 4,942,570 A | * | 7/1990 | Kotzin et al. ............... 370/263 |
| 5,117,423 A | * | 5/1992 | Shepherd et al. ........... 370/280 |
| 5,327,576 A | | 7/1994 | Uddenfelt et al. | |
| 5,446,739 A | * | 8/1995 | Nakano et al. ............. 370/337 |
| 5,818,820 A | * | 10/1998 | Anderson et al. ........... 370/280 |
| 6,092,222 A | * | 7/2000 | Jolma et al. ................. 714/76 |
| 6,289,217 B1 | * | 9/2001 | Hamalainen et al. ........ 455/425 |
| 6,292,664 B1 | * | 9/2001 | Ostrup ........................ 455/453 |

FOREIGN PATENT DOCUMENTS

| | | |
|---|---|---|
| WO | WO87/06083 | 10/1987 |
| WO | WO98/48580 | 10/1998 |

OTHER PUBLICATIONS

International Search Report, International Application No. PCT/US00/02497.

* cited by examiner

*Primary Examiner*—Thanh Cong Le
*Assistant Examiner*—Andrew T Harry
(74) *Attorney, Agent, or Firm*—Merchant & Gould (57) ABSTRACT

A method of allocating time slots in a time division multiple access cellular telephone system increases the traffic capacity of a base station's RF channel. A method is provided for operating in half rate mode while maintaining adequate signal quality over the RF channel communications link between a base station and a mobile station. In full rate mode, each mobile station is allocated at least four of the twelve slots. For mobile stations experiencing little or no signal deterioration from other sources, a channel can be operated in half rate mode with little or no adverse effect to the signal quality. For mobile stations that are experiencing signal deterioration, the same channel can provide full rate mode support.

11 Claims, 5 Drawing Sheets

METHOD FOR INCREASING THE COMMUNICATION CAPACITY OF A CELLULAR TELEPHONE SYSTEM

TECHNICAL FIELD

The present invention relates generally to a time division multiple access (TDMA) cellular telephone system and more particularly to increasing the traffic capacity in a TDMA cellular telephone system by increasing the transmission capacity of a time slot.

BACKGROUND OF THE INVENTION

In a time division multiple access (TDMA) cellular telephone system, an analog voice signal is delivered to the base station of a cell for transmission to a remote user or mobile station in the cell by means of a radio frequency (RF) downlink signal. At the base station, the analog voice signal is first digitized. The digitized voice signal is next compressed using known voice compression techniques. In order to preserve the quality of the signal during transmission to the mobile station, forward error protection data is added to the compressed voice signal. Forward error protection is a known signal processing technique that allows the mobile station to recover valid data in the presence of transmission errors. The compressed voice signal with forward error protection data is then multiplexed with other compressed voice signals having forward error protection data and transmitted as an RF signal to the mobile stations within the cell serviced by the base station. The transmitted compressed voice signal with forward error protection data is received by the mobile station, decompressed, and converted to an analog signal to recover the original voice signal. In the same fashion, the mobile station may also digitize, compress, add forward error protection, and transmit the compressed voice signal with forward error protection back to the base station.

The voice signal compression or encoding process at the base station is done using known voice encoders (vocoders) and data compression techniques. Likewise, the decompression process at the mobile station or remote user is done using known decoders and known decompression techniques. The voice signal is compressed and decompressed in order to conserve bandwidth within the RF transmission spectrum. Adding forward error protection data to the compressed voice signal requires additional bandwidth.

The amount of signal compression of the vocoder is quantified by the ratio of the input data rate of the digitized voice signal to the output data rate for the compressed voice signal. For instance, if the digitized voice signal input to the vocoder is 64 kilobits per second (kbps) and if the output from the vocoder is 8 kbps, then the vocoder has compressed the voice signal 8 times and has an 8:1 compression ratio. The capacity of a digital TDMA cellular telephone system is determined by the bit rate needed for each mobile station to communicate versus the total bit rate that the base station can support. For example, if each mobile station needs 10 kbps of bandwidth and if the base station can support 100 kbps of bandwidth, then the base station can support 10 mobile stations.

Figure 3A:
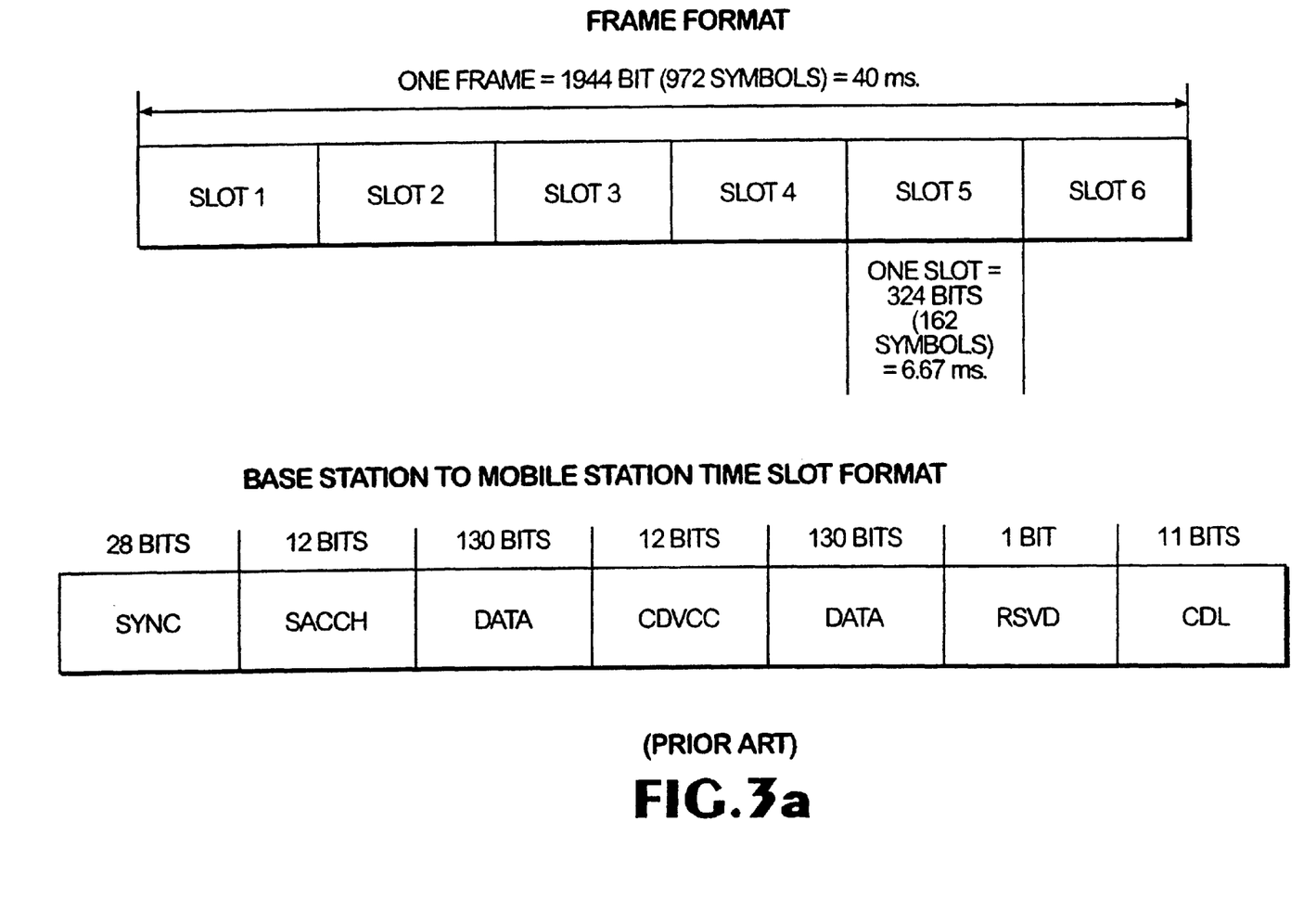
FIG. 3a is a chart showing the relationship of a frame and time slots for a conventional 30 kHz RF channel.

In a TDMA cellular telephone system (such as specified by TIA Standard IS-136, which is incorporated herein by reference), the RF transmission spectrum is divided up into smaller portions of spectrum, called channels, which in turn are then time-shared by a number of mobile stations. For instance, TIA Standard IS-136 defines a base station for a TDMA cellular telephone system which has a set of RF channels, each 30 kilohertz (kHz) in bandwidth. Each RF channel is time divided into frames, and each frame is divided into 6 equally spaced time slots as shown in FIG. 3a. The length of each frame is 40 milliseconds or 1944 bits or 972 symbols. The length of each time slot is 6.67 milliseconds or 324 bits or 162 symbols.

The mobile stations served by a single 30 kHz RF channel are allocated different time slots so that the mobile stations can share the RF channel by communicating (transmitting or receiving a voice signal) only within the prescribed time slots of the RF channel. TIA Standard IS-136 defines two types of voice transmission, half rate in which each mobile station only uses one time slot out of the 6 per frame and full rate in which each mobile station uses two time slots out of 6 per frame. Therefore, the number of voice channels that are available for each 30 kHz RF channel is 6 for half rate and 3 for full rate operation. In either mode of operation (i.e., half rate or full rate), the mobile station receives a sequence of frames and recognizes and decodes the data in the time slots allocated to the mobile station.

The quality of the voice signal received by a mobile station is dependent on the degree of signal compression, the amount of forward error protection data transmitted, and the strength of the RF signal at the mobile station's location. Generally, vocoders that compress speech to a lower bit rate (higher compression ratio) will have a lower voice quality than vocoders with a higher bit rate output (lower compression ratio). Also, the quality of the signal received by the mobile station is improved by transmitting more forward error protection data with the compressed voice signal. Both high bit rate and added forward error protection data require additional transmission bandwidth. Therefore, there is a direct tradeoff between the voice quality that a mobile station will experience versus the capacity of the base station.

The quality of the voice signal received by a mobile station is also affected by the strength of the RF signal at the mobile station's location. As the mobile stations move away from the base station, the strength of the RF signal diminishes, and the quality of the voice transmission may deteriorate as a result.

There is a need for base stations with increased communications capacity. One way of accomplishing this is to operate the channels of a base station in half rate time-sharing mode. Unfortunately, the quality of the voice signal received by a mobile station can be adversely affected by the time-sharing mode of the mobile station. Half rate communication mode increases the traffic capacity on a particular channel. However, half rate mode also increases the time between encoded voice data packets. It is well known that interleaving voice data can improve signal quality. Increasing the interleaving depth of half rate voice data packets increase transmission quality, to a certain point. However, interleaving depths beyond that point decreases transmission quality. Therefore, there is a need for increasing the traffic capacity of a channel by operating in half rate mode, while maintaining the signal quality of the signal received by each mobile station by increasing the interleaving depth of a half rate voice data transmission.

SUMMARY OF THE INVENTION

In order to increase the traffic capacity of a base station's RF channel, the present invention provides a method for operating in half rate mode while maintaining adequate signal quality over the communication link (RF channel)

between the base station and the mobile station. Voice data is typically transmitted from the base station to the mobile station in a sequential series of frames which are divided into time slots. Because the signal quality of the communications link depends on, among other things, the interleaving depth of received time slots, increasing the interleaving depth of sequential time slots within a frame will improve signal quality. However, time slots that have an interleaving depth of the length of an entire frame or more can create signal quality deterioration that is perceivable to the mobile station's user. Increasing the interleaving depth between sequential time slots may be accomplished by allocating more than one time slot within a given frame to a particular mobile station. However, the conventional method of frame division does not provide for this while operating the channel in half rate mode.

The present invention addresses this need by permitting a channel to operate in half rate mode, but dividing each frame into twelve or more slots instead of the conventional six slots. In half rate mode, each mobile station is allocated two of the twelve slots. In full rate mode, each mobile station is allocated four of the twelve slots. For mobile stations experiencing little or no signal deterioration from other sources (e.g., distance from base station), a channel can be operated in half rate mode with little or no adverse effect to the signal quality. For mobile stations that are experiencing signal deterioration, the same channel can provide full rate mode support. At half rate operation, signal deterioration due to an interleaving depth of an entire frame or more than one frame is reduced by transmitting two, half rate time slots within the same frame. For a mobile station requiring full rate operation, four, full rate time slots will be allocated to the mobile station.

In another aspect of the present invention, the time slots may not be evenly divided into twelve time slots. In this aspect of the invention, the frame may be divided into irregularly sized time slots. Some time slots in the frame may be longer or shorter than other frames in the time slot.

In yet another aspect of the invention, a frame may be divided into more than twelve time slots. In this aspect of the invention, half rate operation may be achieved by the dividing the half rate voice data among three or more time slots.

In order to determine which mobile stations require full rate mode, the base station monitors the signal quality transmitted to the mobile stations. For example, the quality of the transmitted signal may be determined by monitoring the bit error rates reported by the various mobile stations, by monitoring the signal strengths from the mobile stations within the base station's cell, by monitoring the carrier-to-interference ratio, or by monitoring a combination of these parameters. Threshold values may then be set for the signal quality (i.e., signal quality parameters) to determine the requirements of the mobile station. The threshold values can be used to trigger the method of the present invention to switch between full rate and half rate modes of operation with respect to a particular mobile station.

DETAILED DESCRIPTION

The environment for the preferred embodiment of the present invention is a time division multiple access (TDMA) cellular telephone system constructed and operated in accordance with TIA Standard IS-136 which is well know to those of ordinary skill in the art. TIA Standard IS-136 is incorporated herein by reference. Turning to the drawings in which like numbers reference like parts or steps, in the several figures, FIG. 1 of this specification is a schematic diagram of two adjacent cells of a TDMA cellular telephone system 10 which constitutes the environment for the preferred embodiment of the present invention. In connection with the following description of the preferred embodiment, the focus will be on increasing the communications capacity of the downlink portion of the TDMA cellular telephone system.

Figure 1:
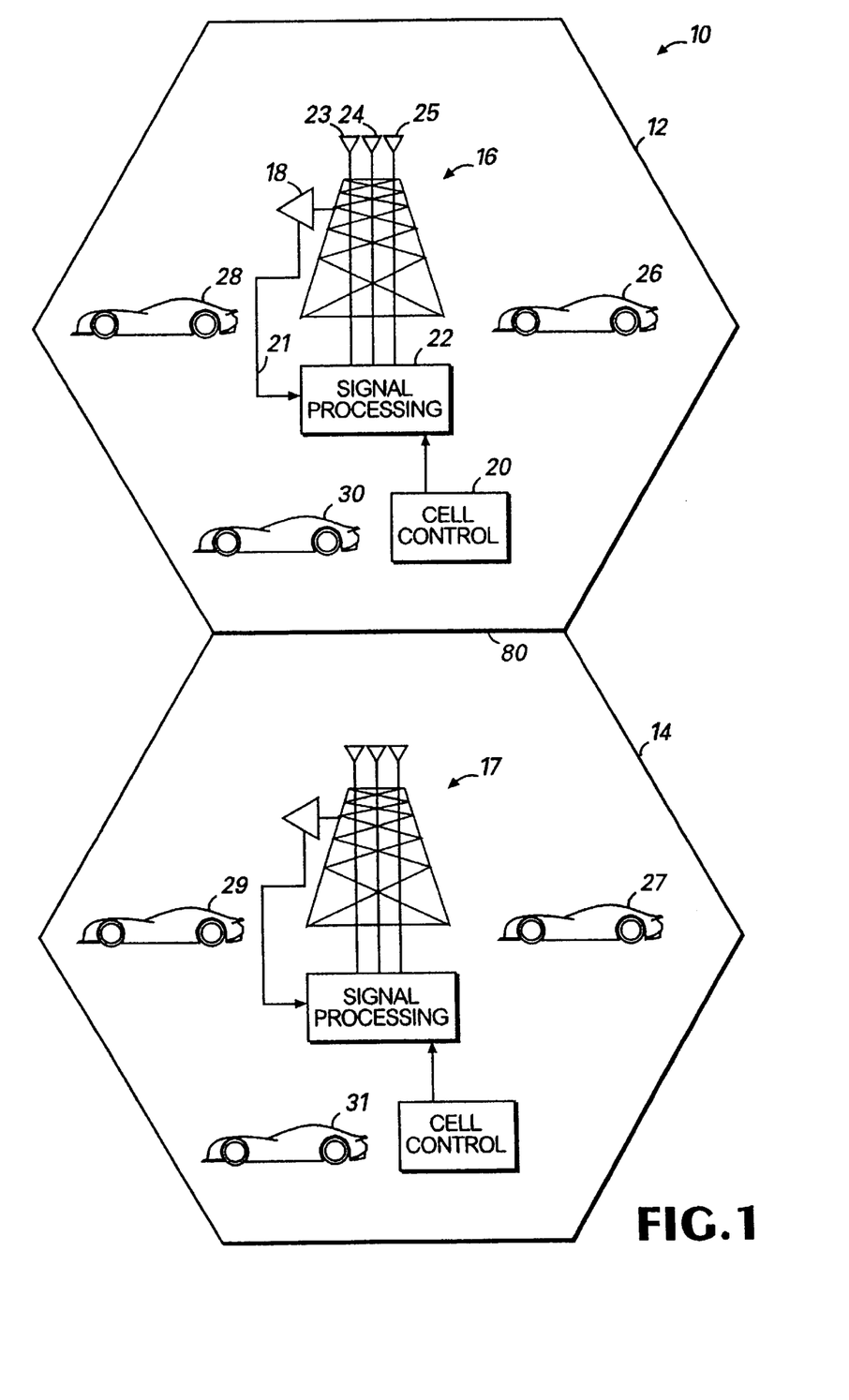
FIG. 1 is a schematic diagram of two adjacent cells of a time division multiple access (TDMA) cellular telephone system which constitutes a portion of the environment for an exemplary embodiment of the present invention.

The TDMA cellular telephone system 10 comprises a number of cells, such as cells 12 and 14, shown for purposes of illustration in FIG. 1. Each cell includes a base station such as base station 16 of cell 12 and base station 17 of cell 14. Within each cell are a number of remote users or mobile stations, such as mobile stations 26, 28, and 30 in cell 12 and mobile stations 27, 29, and 31 in cell 14. By the very nature of the mobile stations, they are able to move within a cell and from cell to cell.

The base station 16 in cell 12 includes receiving antennas 23 and 25, cell control circuit 20, signal processing circuit 22, and transmission antenna 24. The base station 17 in cell 14 is similarly configured.

In connection with the operation of cell 12 of the TDMA cellular telephone system 10, analog voice signals or other data are received from a local telephone company switching system via antenna 18. Alternatively, analog telephone signals or other data could be delivered to the cell 12 by means of conventional telephone lines. The analog voice signals or other data received on antenna 18 are connected to signal processing circuit 22 via line 21. In the digital TDMA cellular telephone system 10, analog telephone signals are digitized, compressed, and multiplexed in the signal processing circuit 22, and then transmitted via antenna 24 to mobile stations 26, 28, and 30 within the cell 12.

Figure 2:
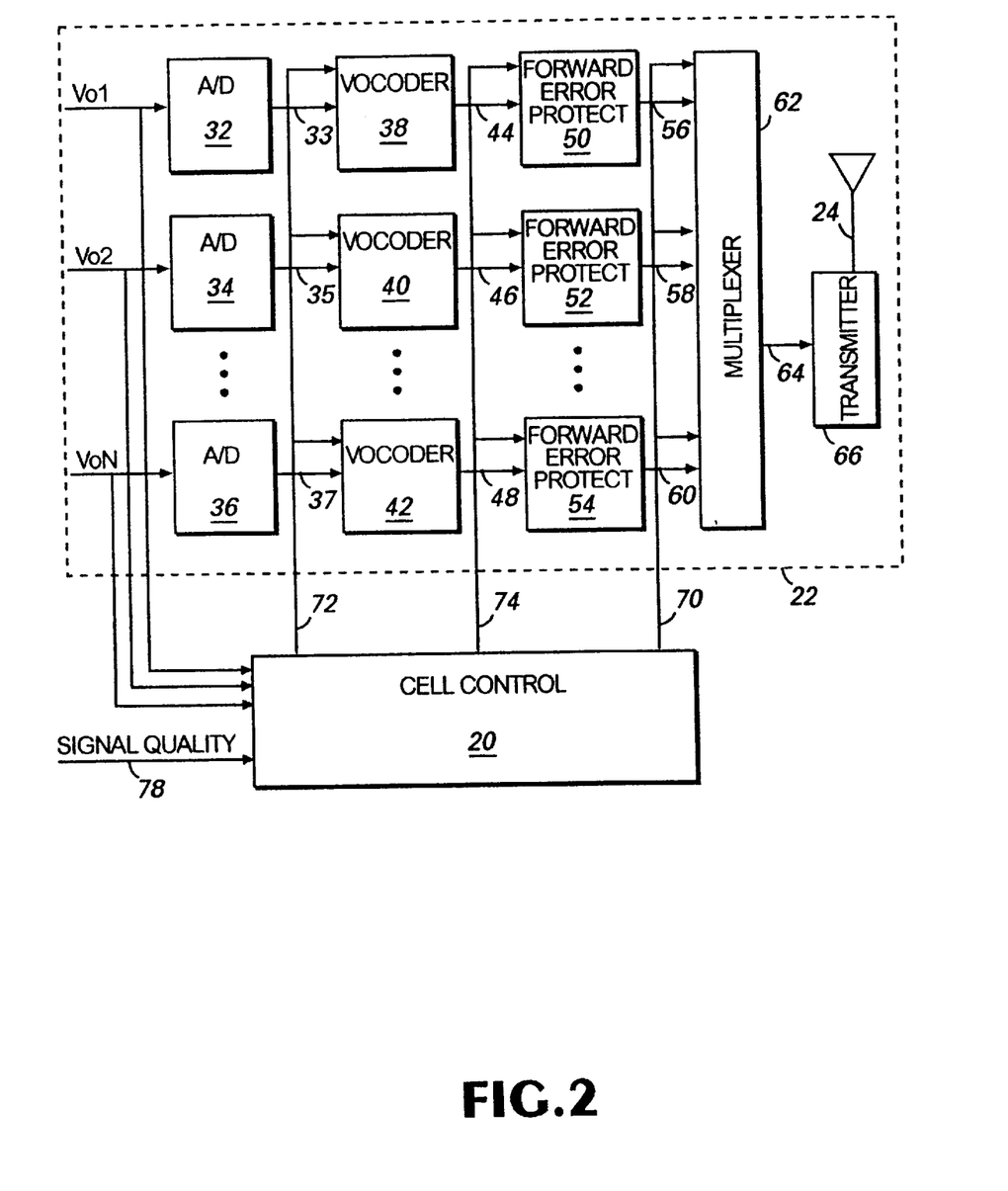
FIG. 2 is a high level block diagram of the signal processing circuit and cell control circuit of an exemplary cellular telephone system.

Turning to FIG. 2, there is shown cell control circuit 20 and the signal processing circuit 22 of the base station 16. The signal processing circuit 22 has analog voice (or data) inputs Vo1, Vo2, and VoN. For each 30 kHz RF channel, N=3 for full rate service and N=6 for half rate service. In the TDMA cellular telephone system 10, each of the analog voice signals Vo1, Vo2, and VoN is connected to an analog to digital (A/D) converter, such as A/D converters 32, 34, and 36 shown in FIG. 2. A/D converters 32, 34, and 36 convert the analog signals Vo1, Vo2, and VoN to digital signals in conventional fashion and produce corresponding digital voice signals on lines 33, 35, and 37. The digital voice signals on lines 33, 35, and 37 have bit rates of generally 64 kilobits per second (kbps). The 64 kbps digital voice signals from the A/D converters 32, 34, and 36 are connected to corresponding voice encoders (vocoders) 38, 40, and 42 shown in FIG. 2. The vocoders 38, 40, and 42 compress the digital voice signals on lines 33, 35, and 37 to produce compressed voice signals on lines 44, 46, and 48. The vocoders compress the digital voice signal from bit rates of about 64 kbps to bit rates of 8 kbps. The vocoders therefore have a compression ratio of 8:1.

The compressed voice signals on lines 44, 46, and 48 are connected to forward error protection circuits 50, 52, and 54 respectively. The forward error protection circuits 50, 52, and 54 add forward error protection data to the compressed voice signals. In the environment of the TDMA cellular telephone system 10, the forward error protection circuits 50, 52, and 54 add an additional 5 kbps of data to the compressed voice signals on lines 56, 58, and 60. Consequently, compressed voice signals on lines 56, 58, and 60 have bit rates of about 13 kbps (i.e., 8 kbps plus 5 kbps). The compressed voice signals on lines 56, 58, and 60 are connected to multiplexer 62 which multiplexes the compressed voice signals having forward error protection data and connects them via line 64 to the RF transmitter 66. The RF transmitter 66 then transmits the multiplexed, compressed voice signals to the mobile stations 26, 28, and 30 within cell 12 (FIG. 1).

Turning to FIG. 3a there is shown, the frame format for the multiplexed signal on line 64 of the TDMA cellular telephone system 10. As previously stated, each base station, such as base station 16, has assigned to it a preselected number of 30 kHz RF channels for transmission and receipt of compressed voice signals to and from the mobile stations 26, 28, and 30. In order to service a number of mobile stations, each 30 kHz RF channel is time divided into frames such as that shown in FIG. 3a. Transmissions from the base station to the mobile station comprise a sequence of adjacent frames. The length of each frame is 40 milliseconds (ms) or 1944 bits or 972 symbols. As shown in FIG. 3a, each frame is divided into 6 equal time slots numbered 1 through 6. The length of each time slot is 6.67 ms or 324 bits or 162 symbols. Thus, given a series of frames, the "temporal distance" between the start of a particular time slot in one frame and the start of the corresponding time slot in the next frame is 40 ms.

Each 30 kHz RF channel of the TDMA cellular telephone system 10 can service 3 mobile stations at full rate and 6 mobile stations at half rate. At full rate two time slots in each frame are received and decoded by each mobile station. At half rate one time slot in each frame is received and decoded by each mobile station. The following discussion will assume that the TDMA cellular telephone system 10 is operating as a full rate system so that each 30 kHz RF channel can service a maximum of 3 mobile stations by using two time slots per mobile station. For example, mobile station 26 will receive its compressed voice signal in time slots 1 and 4, mobile station 28 will receive its compressed voice signal in time slots 2 and 5, and mobile station 30 will receive its compressed voice signals in time slots 3 and 6.

The 324 bits for each time slot are allocated as indicated in FIG. 3a. The first 28 bits of each time slot provide synchronization between the base station and the mobile station. The next 12 bits of each time slot are assigned to the slow associated control channel (SACCH). The next 130 bits of each time slot are for the compressed voice data. The next 12 bits of each time slot are assigned to the coded digital verification color code (CDVCC). The next 130 bits of each time slot are for the compressed voice data. The next bit of each time slot is reserved. The last 11 bits of each time slot are assigned to the coded digital control channel locator (CDL). The signals transmitted by the allocated bits of each time slot are defined by TIA Standard IS-136. The bits of each time slot, which are not used for voice data, are generated by the cell control circuit 20, are connected to the multiplexer 62 via line 70, and are inserted into each time slot by the multiplexer 62 in the proper sequence to produce the multiplexed signal on line 64.

When a first mobile station, such as mobile station 30 approaches boundary 80 of the cell 12, the quality of the voice signal received by that mobile station 30 may deteriorate. The cell control circuit 20 can identify the mobile station 30 that is experiencing signal deterioration by monitoring a signal quality parameter on line 78. The signal quality parameter may be determined in a number of ways. For example, the signal quality parameter on line 78 may result from monitoring the bit error rate (BER) from each of the mobile stations, the signal strength of each of the mobile stations, the carrier to interference ratio, or a combination of those parameters. The cell control circuit 20 receives the signal quality parameter on line 78 for each of the mobile stations 26, 28, and 30. The BER and signal strength from each of the mobile stations are ordinarily monitored by the base station so that the base station can hand off the mobile station to a better channel of the same base station or to the next cell when the mobile station moves from one cell (such as cell 12 in FIG. 1) to the next (such as cell 14).

When the signal quality parameter on line 78 reaches a predetermined threshold level for a particular mobile station, the cell control circuit 20 identifies that mobile station as a mobile station that requires full rate support. By monitoring the signal quality parameter, the cell control circuit 20 can identify a mobile station, such as mobile station 30, to which the base station will provide full rate support.

As discussed above, each 30 kHz RF channel of the TDMA cellular telephone system 10 can service 3 mobile stations at full rate and 6 mobile stations at half rate. At full rate two time slots in each frame are received and decoded by each mobile station. At half rate one time slot in each frame is received and decoded by each mobile station. Because more mobile stations can be supported at half rate than at full rate, a cellular telephone system operating at half rate can increase the number of users to which the system can provide service. However, half rate operation increases the chances of signal deterioration between the mobile station and the base station.

Whereas the full rate temporal spacing (interleaving depth) between time slots received by a mobile station is 20 ms, the half rate spacing is 40 ms. Temporal spacing of an entire frame or more increases the likelihood that the signal from the base station to the mobile station will deteriorate. For some mobile stations within a given cell, half rate communications will be insufficient to provide clear voice transmission. For example, for mobile stations near the boundaries of a cell, half rate communication may be insufficient to provide reliable communication between such mobile stations and a base station. One way to enjoy the benefits of half rate communication and reliability of full rate communication is for the base station to employ both rates within the same channel.

Figure 3B:
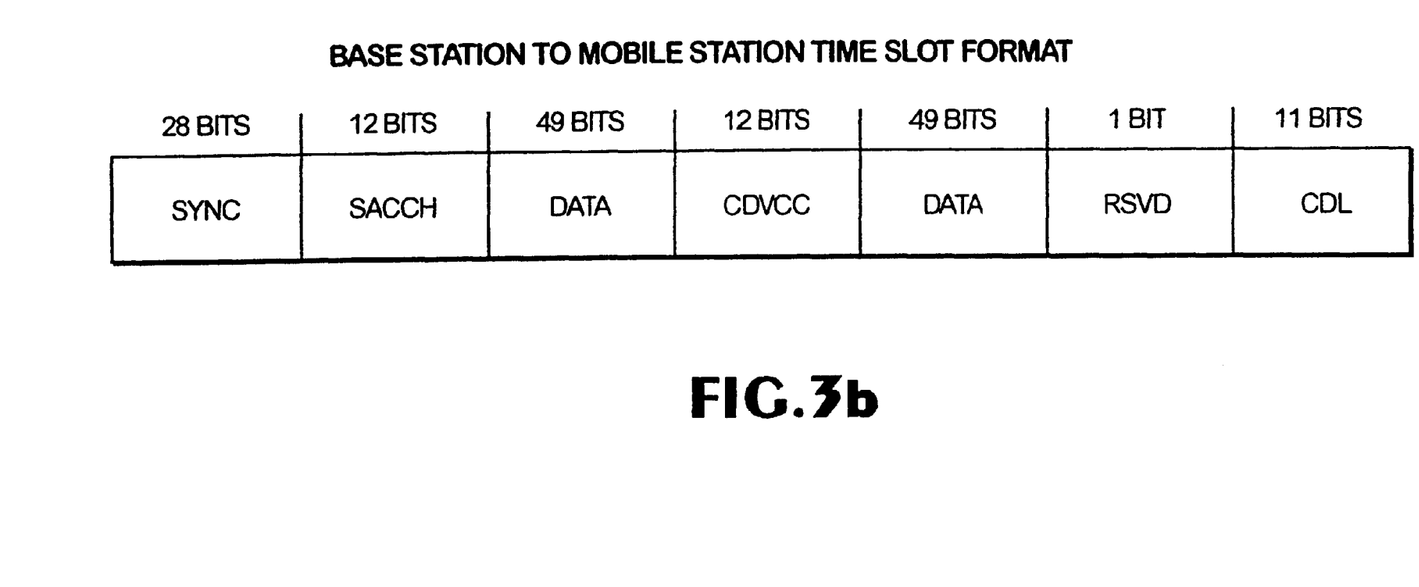
FIG. 3b is a chart showing the relationship of a frame and time slots for a 30 kHz RF channel of an exemplary embodiment of the present invention.

Turning now to FIG. 3b, a frame format for a multiplexed signal in an exemplary embodiment of the present invention is shown. Transmissions between the mobile stations and the base station comprise a sequence of adjacent frames. As with the conventional frame format, the length of each frame is 40 milliseconds (ms) or 1944 bits or 972 symbols. As shown in FIG. 3a, the conventional frame is divided into 6 equal time slots numbered 1 through 6. The length of each time slot is 6.67 ms or 324 bits or 162 symbols. Thus, given a series of half rate frames, the "temporal distance" between the start of a particular time slot in one frame and the start of the corresponding time slot in the next frame is 40 ms.

For half rate operation, it is well known that signal quality deterioration is produced at least in part by the separation of time slots by an entire frame length or more. For example, a mobile station operating in half rate mode may receive each first time slot in each frame. The interleaving depth between these slots is 40 ms. It is also known that some interleaving depth (i.e., greater than zero) increases signal quality. Therefore, an ideal interleaving depth for time slots in half rate operation is somewhere in the range between 0 ms and 40 ms. The conventional frame format shown in FIG. 3a does not provide for an interleaving depth in this range. Indeed, the convention frame format only provides for a 0 ms or a 40 ms interleaving depth of half rate time slots. An exemplary embodiment of the present invention provides for the use of an interleaving depth of half rate time slots between 0 ms and 40 ms.

The frame format of FIG. 3b has been divided into 12 time slots, making each time slot 3.33 ms or 162 bits or 81 symbols. Advantageously, the mobile stations that are operating at half rate can receive two slots that have an interleaving depth of 20 ms. For example, a mobile station can be configured to receive the information in time slot 1 and time slot 7. These time slots have an interleaving depth of 20 ms. Thus, the signal deterioration that is associated with the separation of time slots is reduced, as compared to half rate operation in which slots have an interleaving depth of the entire length of a frame (e.g., 40 ms). In this example, the temporal distance between time slot 1 and time slot 7 is only 20 ms; the distance between time slot 7 and time slot 1 of the next frame will also be only 20 ms. Because two time slots per frame are used to communicate information to the mobile station in half rate mode, the effects of the interleaving depth between the time slots are minimized by decreasing the interleaving depth to less than 40 ms, while increasing the interleaving depth to more than 0 ms.

The 162 bits for each of the twelve time slots are allocated as indicated in FIG. 3b. The first 28 bits of each time slot provide synchronization between the base station and the mobile station. The next 12 bits of each time slot are assigned to the slow associated control channel (SACCH). The next 49 bits of each time slot are for the compressed voice data. The next 12 bits of each time slot are assigned to the coded digital verification color code (CDVCC). The next 49 bits of each time slot are for the compressed voice data. The next bit of each time slot is reserved. The last 11 bits of each time slot are assigned to the coded digital control channel locator (CDL). The signals transmitted by the allocated bits of each time slot are defined by TIA Standard IS-136. The bits of each time slot, which are not used for voice data, are generated by the cell control circuit 20, are connected to the multiplexer 62 via line 70, and are inserted into each time slot by the multiplexer 62 in the proper sequence to produce the multiplexed signal on line 64.

Another advantage to the twelve slot frame of an exemplary embodiment of the present invention is the ability to concurrently support full rate communications with mobile stations that require full rate support. For example, mobile stations that are close to a boundary of a particular cell may require full rate support, because of the weakness of the signal at a particular distance from the base station. In cases where full rate support is required, four slots can be utilized to provide this support. For example, slots 1 and 2 can be utilized as a single slot and slots 7 and 8 can be utilized as a single slot. The mobile station receiving the four slots will enjoy full rate support without regard to the fact that the frame is actually divided into 12 slots.

Advantageously, mobile stations that are not experiencing signal deterioration can utilize only two slots in the frame, as described above (rather than four). Thus, full rate and half rate modes of communication can co-exist. A first mobile station operating in half rate mode can receive slots 1 and 7, while a second mobile station operating in full rate mode can receive slots 2, 3, 8, and 9. This co-existence provides the increased capacity afforded by half rate mode as well as the increased signal quality of full rate mode. Ideally, all of the mobile stations serviced by a particular base station would be operable in half rate mode. If all of the mobile stations were capable of operating in half rate mode, then the communication capability of the downlink of a particular base station would be effectively doubled.

As described above in connection with FIG. 3a, the base station can determine the signal strength of a channel by monitoring a signal quality parameter. When the signal quality parameter corresponding to a communications link between the base station and a particular mobile station falls below a predetermined threshold value, the base station can make a determination that the mobile station requires full rate support. If the mobile station is operating at half rate support, then the base station can switch modes of communication to full rate support by allocating an additional two slots (of twelve) to the mobile station. The base station will thereafter be able to communicate with the mobile station in full rate mode. Similarly, if a mobile station that is operating at full rate mode experiences an improvement in signal quality (e.g., the signal quality parameter rises above the predetermined threshold), then the base station can switch the communication mode to half rate.

Those skilled in the art will appreciate that the frame format can be divided into more or less than twelve time slots, while still providing an increased traffic capacity and improved signal quality. For example, a frame could be divided into 18 time slots and the half rate voice data divided into three time slots. It will also be appreciated that the time slots may be divided irregularly, such that some time slots are longer or shorter than others.

Figure 4:
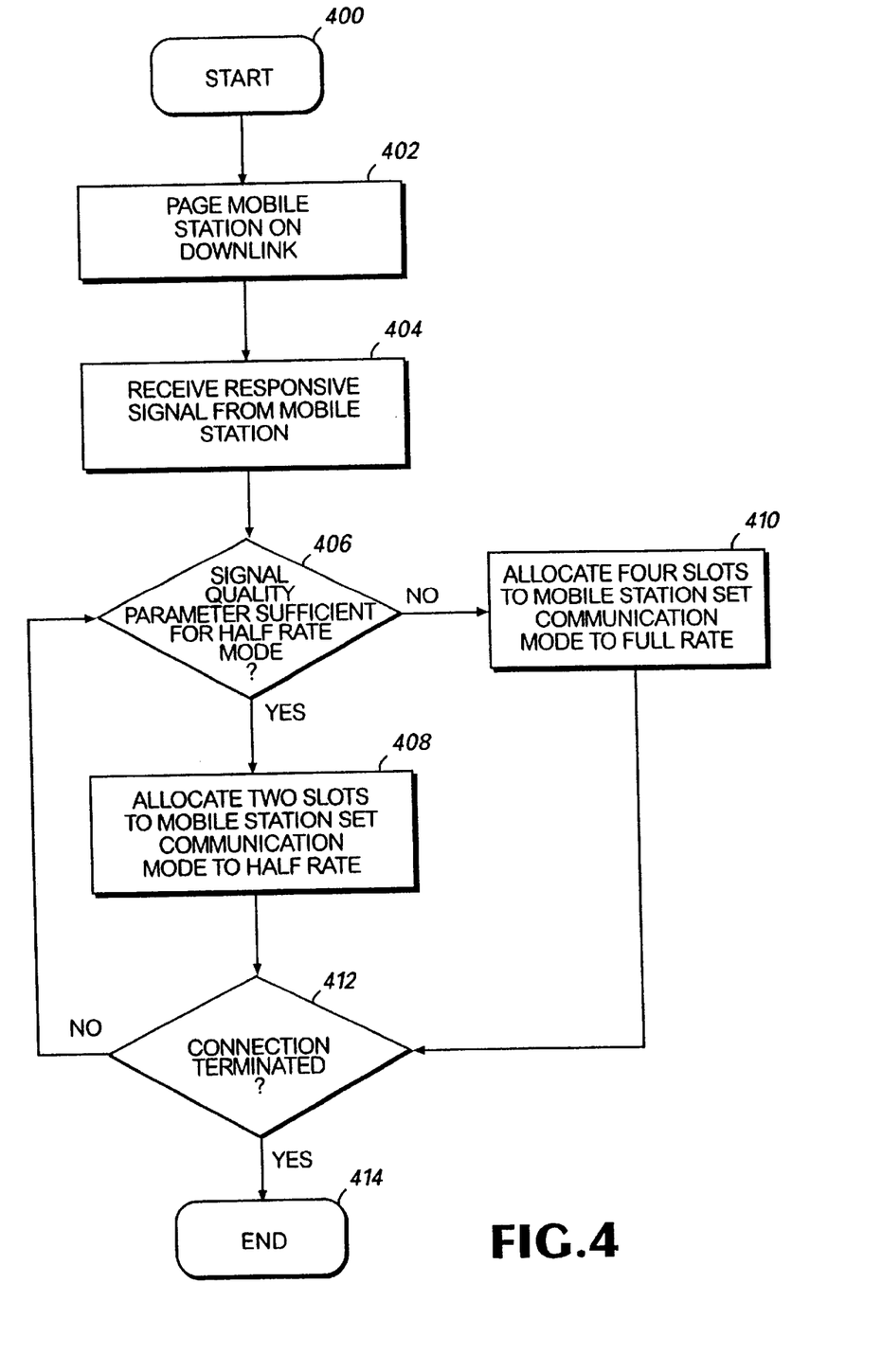
FIG. 4 is a flow diagram showing the method of an exemplary embodiment of the present invention implemented by the cell control circuit.

Referring now to FIG. 4, a flow chart is shown, depicting a method of an exemplary embodiment of the present invention. The method of FIG. 4 is implemented in cell control circuit 20. Cell control circuit 20 comprises a multipurpose digital computer which is programmed in accordance with the method of the present invention, and particularly the method illustrated in FIG. 4. The method of FIG. 4 depicts the method of an exemplary embodiment of the present invention following an attempt to contact a mobile station within the cell associated with a particular base station. For example, when a caller attempts to place a call to a mobile station.

The method of an exemplary embodiment of the present invention starts at step 400 and proceeds to step 402. At step 402, the base station pages the mobile station in order to establish a communication link between the mobile station and the base station. The method then proceeds to step 404. At step 404, the base station receives a responsive signal from the mobile station, indicating that the communication link between the mobile station and the base station is operational. The method proceeds to step 406, wherein a determination is made as to whether the signal quality parameter is sufficient for half rate mode. If the communication link between the base station and the mobile station is weak, then the signal quality parameter will not be sufficient for half rate mode. If the communication link between the base station and the mobile station is strong, then the signal quality parameter will be sufficient for half rate mode.

If the signal quality parameter is sufficient for half rate mode, then the method branches to step 408. At step 408, two slots are allocated to the mobile station and the communications mode is set to half rate. Thereafter, the mobile station will receive signals from the base station in two of the twelve slots of each frame, thereby providing half rate support. Returning to step 406, if the signal quality parameter is not sufficient for half rate mode, then the method branches to step 410. At step 410 four slots are allocated to the mobile station and the communications mode is set to full rate. Thereafter, the mobile station will receive signals from the base station in four of the twelve slots of each frame, thereby providing full rate support.

The method proceeds from steps 408 and 410 to decision block 412. At decision block 412, a determination is made as to whether the connection (i.e., communication link) between the mobile station and the base station has been terminated. If the connection has been terminated, then the method ends at step 414. If the connection has not been terminated, then the method branches back to decision block 406. This cycle can be repeated indefinitely at predetermined intervals throughout the period in which a communication link exists between a base station and a mobile station.

While the method of FIG. 4 depicts the use of a twelve time slot frame format, it will be appreciated that the method could be used for frame formats with more or less time slots.

The above description is directed toward the exemplary embodiment of the present invention in which a conventional cellular telephone system is modified to provide both full rate and half rate coverage concurrently. However, those skilled in the art will appreciate the invention can be utilized within the context of other communication systems that utilize a multiplexed communications protocol. The above description is not intended to limit the application of the invention to cellular telephone systems.

What is claimed is:

1. In a time division multiple access cellular telephone system including a base station and at least one mobile station, wherein the base station and the mobile station are operative to communicate via a communications link over which a series of frames are transmitted, a method for increasing the number of mobile users with which the base station can communicate, comprising:
   a. dividing a first frame into a plurality of time slots so that there are twice as many time slots as in a conventional frame;
   b. allocating at least two non-adjacent slots to the mobile station; and
   c. transmitting voice data in a half rate mode to the mobile station by dividing the voice data among the at least two non-adjacent time slots.

2. The method of claim 1, wherein the conventional frame has six time slots and dividing the first frame into a plurality of time slots comprises dividing the first frame into twelve time slots.

3. In a time division multiple access cellular telephone system including a base station and at least one mobile station, wherein the base station and the mobile station are operative to communicate via a communications link over which a series of frames are transmitted, a method for increasing the number of mobile users with which the base station can communicate, comprising the steps of:
   a. dividing a first frame into more than six time slots;
   b. allocating at least two non-adjacent slots to the mobile station; and
   c. transmitting voice data in a half rate mode to the mobile station by dividing the voice data among the at least two non-adjacent time slots.

4. The method of claim 3, wherein the two non-adjacent time slots have an interleaving depth of less than 40 ms.

5. The method of claim 3, wherein the two non-adjacent time slots have an interleaving depth 20 ms.

6. In a time division multiple access cellular telephone system including a base station and at least one mobile station, wherein the base station and the mobile station are operative to communicate via a communications link over which a series of frames are transmitted, a method for increasing the number of mobile users with which the base station can communicate, comprising the steps of:
   a. dividing a first frame into twelve time slots;
   b. allocating two non-adjacent time slots to a first mobile station;
   c. allocating four of the time slots to a second mobile station, wherein the four time slots are arranged as two non-adjacent sets of two adjacent time slots;
   d. transmitting voice data in a half rate mode to the first mobile station; and
   e. transmitting voice data in a full rate mode to the second mobile station.

7. The method of claim 6, wherein the two non-adjacent time slots have an interleaving depth of less than 40 ms.

8. The method of claim 6, wherein the two non-adjacent time slots have an interleaving depth 20 ms.

9. In a time division multiple access cellular telephone system including a base station and at least one mobile station, wherein the base station and the mobile station are operative to communicate via a communications link over which a series of frames are transmitted, a method for increasing the number of mobile users with which the base station can communicate, comprising the steps of:
   a. dividing a first frame into more than six time slots;
   b. allocating at least two non-adjacent time slots to a first mobile station;
   c. transmitting voice data in a half rate mode to the first mobile station;
   d. monitoring a signal quality parameter for the first mobile station; and
   e. allocating at least one additional time slot to the first mobile station and transmitting voice data in a full rate mode to the first mobile station, in response to a determination that the signal quality parameter is less than a predetermined threshold.

10. The method of claim 9, wherein the two non-adjacent time slots have an interleaving depth of less than 40 ms.

11. The method of claim 9, wherein the two non-adjacent time slots have an interleaving depth 20 ms.

* * * * *

UNITED STATES PATENT AND TRADEMARK OFFICE
CERTIFICATE OF CORRECTION

PATENT NO.   : 6,608,827 B1
DATED        : August 19, 2003
INVENTOR(S)  : Austin It is certified that error appears in the above-identified patent and that said Letters Patent is hereby corrected as shown below:

<u>Title page,</u>
Item [57], ABSTRACT,
Line 6, after the words "mobile station." insert the following -- The present invention permits a channel to operate in half rate mode, but divides each frame into more than the conventional six slots. In half rate mode, each mobile station is allocated at least two of the twelve slots. --

Signed and Sealed this

Sixteenth Day of December, 2003

JAMES E. ROGAN
*Director of the United States Patent and Trademark Office*